United States Patent
Wang et al.

(10) Patent No.: US 11,188,772 B2
(45) Date of Patent: Nov. 30, 2021

(54) DRIVE METHOD FOR TEXTURE RECOGNITION DEVICE AND TEXTURE RECOGNITION DEVICE

(71) Applicant: BOE TECHNOLOGY GROUP CO., LTD., Beijing (CN)

(72) Inventors: Haisheng Wang, Beijing (CN); Xue Dong, Beijing (CN); Yingming Liu, Beijing (CN); Xiaoliang Ding, Beijing (CN); Lei Wang, Beijing (CN); Changfeng Li, Beijing (CN); Yapeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/765,936

(22) PCT Filed: Nov. 28, 2019

(86) PCT No.: PCT/CN2019/121640
§ 371 (c)(1),
(2) Date: May 21, 2020

(87) PCT Pub. No.: WO2020/186818
PCT Pub. Date: Sep. 24, 2020

(65) Prior Publication Data
US 2021/0201063 A1 Jul. 1, 2021

(30) Foreign Application Priority Data
Mar. 15, 2019 (CN) .......................... 201910200062.X

(51) Int. Cl.
*G06K 9/20* (2006.01)
*G06K 9/00* (2006.01)
(Continued)

(52) U.S. Cl.
CPC ......... *G06K 9/2027* (2013.01); *G06K 9/0004* (2013.01); *G06K 9/209* (2013.01);
(Continued)

(58) Field of Classification Search
CPC .... G06K 9/2027; G06K 9/2036; G06K 9/209; G06K 9/0004; G06K 9/00;
(Continued)

(56) References Cited

U.S. PATENT DOCUMENTS

2014/0355846 A1* 12/2014 Lee ................ G06K 9/0004
382/124
2016/0132712 A1* 5/2016 Yang ............... G06K 9/00892
348/77

FOREIGN PATENT DOCUMENTS

CN 107480584 A 12/2017
CN 206907046 U 1/2018
(Continued)

OTHER PUBLICATIONS

International Search Report of PCT/CN2019/121640 in Chinese, dated Feb. 26, 2020 with English translation.

*Primary Examiner* — Abhishek Sarma
(74) *Attorney, Agent, or Firm* — Collard & Roe, P.C.

(57) ABSTRACT

A drive method for a texture recognition device and a texture recognition device. The texture recognition device includes a light source array and an image sensor array. The image sensor array includes a plurality of image sensors, the plurality of image sensors are configured to receive light emitted from the plurality of sub-light sources and then reflected by a texture to the plurality of image sensors for a texture collection; the drive method includes: at a first moment, the light source array operating to provide a first photosensitive light source, and at the first moment or a second moment different from the first moment, the light source array operating to provide a second photosensitive
(Continued)

light source. A first imaging range of the first photosensitive light source on the image sensor array partially overlaps a second imaging range of the second photosensitive light source on the image sensor array.

19 Claims, 10 Drawing Sheets

(51) Int. Cl.
　　*G06F 3/041* (2006.01)
　　*G09G 3/3208* (2016.01)
(52) U.S. Cl.
　　CPC ............ *G06K 9/2036* (2013.01); *G06F 3/041* (2013.01); *G09G 3/3208* (2013.01); *G09G 2300/0452* (2013.01); *G09G 2360/145* (2013.01)
(58) Field of Classification Search
　　CPC ..... G09G 2360/145; G09G 2300/0452; G09G 3/3208; G06F 3/041
　　See application file for complete search history.

(56) References Cited

FOREIGN PATENT DOCUMENTS

| | | | |
|---|---|---|---|
| CN | 107977627 A | 5/2018 | |
| CN | 108734073 A | 11/2018 | |

* cited by examiner

DRIVE METHOD FOR TEXTURE RECOGNITION DEVICE AND TEXTURE RECOGNITION DEVICE

CROSS REFERENCE TO RELATED APPLICATIONS

This application is the National Stage of PCT/CN2019/121640 filed on Nov. 28, 2019, which claims priority under 35 U.S.C. § 119 of Chinese Application No. 201910200062.X filed on Mar. 15, 2019, the disclosure of which is incorporated by reference.

TECHNICAL FIELD

The embodiments of the present disclosure relate to a drive method for a texture recognition device and a texture recognition device.

BACKGROUND

With increasing popularity of mobile terminals, more and more users use the mobile terminals to perform operations such as identity verification, electronic payment and so on. Because of the uniqueness of skin textures such as fingerprint patterns or palm print patterns, fingerprint recognition technology combined with optical imaging is gradually adopted by mobile electronic devices for identity verification, electronic payment, etc. How to improve the speed and accuracy of texture recognition is a focus problem in the art.

SUMMARY

At least one embodiment of the present disclosure provides a drive method for a texture recognition device, the texture recognition device comprises a light source array and an image sensor array. The light source array comprises a plurality of sub-light sources; the image sensor array is on a side of the light source array, and comprises a plurality of image sensors, the plurality of image sensors are configured to receive light emitted from the plurality of sub-light sources and then reflected by a texture to the plurality of image sensors for a texture collection; the drive method comprises: at a first moment, the light source array operating to provide a first photosensitive light source, and at the first moment or a second moment different from the first moment, the light source array operating to provide a second photosensitive light source, a first imaging range of the first photosensitive light source on the image sensor array partially overlaps with a second imaging range of the second photosensitive light source on the image sensor array.

For example, in the drive method provided by at least one embodiment of the present disclosure, the first photosensitive light source comprises at least one sub-light source of the plurality of sub-light sources, the second photosensitive light source comprises multiple sub-light sources of the plurality of sub-light sources, in a case where the second photosensitive light source is provided at the second moment, a count of sub-light sources comprised in the second photosensitive light source is more than a count of sub-light sources comprised in the first photosensitive light source, the first imaging range is in a first ring shape, the second imaging range is in a second ring shape, and the second ring shape at least partially covers a ring center portion of the first ring shape.

For example, in the drive method provided by at least one embodiment of the present disclosure, at the first moment, the light source array operates to further provide a third photosensitive light source, the third photosensitive light source comprises at least one sub-light source of the plurality of sub-light sources, a count of sub-light sources comprised in the third photosensitive light source is equal to the count of sub-light sources comprised in the first photosensitive light source, a third imaging range of the third photosensitive light source on the image sensor array is in a third ring shape, and the second ring shape at least partially covers a ring center portion of the third ring shape.

For example, in the drive method provided by at least one embodiment of the present disclosure, the count of sub-light sources comprised in the second photosensitive light source provided at the second moment is 2-3 times the count of sub-light sources comprised in the first photosensitive light source provided at the first moment.

For example, in the drive method provided by at least one embodiment of the present disclosure, the first photosensitive light source comprises 3×3 sub-light sources arranged in an array, and the second photosensitive light source comprises 7×7 sub-light sources arranged in an array.

For example, in the drive method provided by at least one embodiment of the present disclosure, the first photosensitive light source comprises at least one sub-light source of the plurality of sub-light sources, the second photosensitive light source comprises at least one sub-light source of the plurality of sub-light sources, in a case where the second photosensitive light source is provided at the first moment, a count of sub-light sources comprised in the second photosensitive light source is equal to a count of sub-light sources comprised in the first photosensitive light source, the first imaging range is in a first ring shape, the second imaging range is in a second ring shape, the first ring shape and the second ring shape have only two intersections, and two closest points, which are on an inner circle of the first ring shape and an inner circle of the second ring shape, respectively, are a first point and a second point, a rectangular imaging range formed by taking the two intersections, the first point, and the second point as centers of four sides of the rectangular imaging range is used to image the texture.

For example, in the drive method provided by at least one embodiment of the present disclosure, each of the first photosensitive light source and the second photosensitive light source comprises 7×7 sub-light sources arranged in an array.

For example, in the drive method provided by at least one embodiment of the present disclosure, the first photosensitive light source comprises at least one sub-light source of the plurality of sub-light sources, the second photosensitive light source comprises at least one sub-light source of the plurality of sub-light sources, in a case where the second photosensitive light source is provided at the second moment, a count of sub-light sources comprised in the second photosensitive light source is equal to a count of sub-light sources comprised in the first photosensitive light source, the first imaging range is in a first ring shape, the second imaging range is in a second ring shape, the second ring shape at least partially covers a ring center portion of the first ring shape, and the first ring shape at least partially covers a ring center portion of the second ring shape, an imaging range formed within a range covered by the first ring shape and the second ring shape is used to image the texture.

For example, in the drive method provided by at least one embodiment of the present disclosure, each of the first photosensitive light source and the second photosensitive light source comprises 7×7 sub-light sources arranged in an array.

For example, in the drive method provided by at least one embodiment of the present disclosure, the ring center portion of the first ring shape and the ring center portion of the second ring shape have an overlapping portion, thereby forming the imaging range, which is in a shape of a Chinese character "回", to image the texture.

For example, the drive method provided by at least one embodiment of the present disclosure further comprises: providing a plurality of first photosensitive light sources arranged in an array at the first moment; and providing a plurality of second photosensitive light sources arranged in an array at the first moment or at the second moment different from the first moment.

For example, in the drive method provided by at least one embodiment of the present disclosure, the texture recognition device has a touch side; the drive method comprises: detecting a contact area between the texture and the touch side, respectively determining a count of sub-light sources comprised in the first photosensitive light source and a count of sub-light sources comprised the second photosensitive light source according to the contact area, and providing a plurality of first photosensitive light sources arranged in an array at the first moment and providing a plurality of second photosensitive light sources arranged in an array at the first moment or at the second moment different from the first moment to image the texture.

For example, in the drive method provided by at least one embodiment of the present disclosure, the texture recognition device has a touch side; the drive method comprises: detecting a contact area between the texture and the touch side, in a case where the contact area is greater than a threshold area, providing a plurality of first photosensitive light sources arranged in an array at the first moment and providing a plurality of second photosensitive light sources arranged in an array at the first moment or at the second moment different from the first moment to image the texture.

For example, in the drive method provided by at least one embodiment of the present disclosure, the texture recognition device comprises a display panel, the display panel comprises a pixel unit array, and the pixel unit array comprises a plurality of pixel units; the light source array comprises the pixel unit array, and the plurality of sub-light sources comprise the plurality of pixel units; the drive method comprises: at the first moment, lighting multiple pixel units arranged continuously to provide the first photosensitive light source, and at the first moment or the second moment different from the first moment, lighting multiple pixel units arranged continuously to provide the second photosensitive light source.

For example, in the drive method provided by at least one embodiment of the present disclosure, each pixel unit comprises a plurality of sub-pixel units that emit light of different colors; lighting the multiple pixel units arranged continuously comprises: lighting sub-pixel units, which are capable of emitting light of a same color, in the multiple pixel units, to allow the multiple pixel units to emit monochromatic light of the same color.

For example, in the drive method provided by at least one embodiment of the present disclosure, the texture recognition device has a touch side, and the image sensor array is on a side of the pixel unit array away from the touch side, the texture recognition device further comprises a filter layer, and the filter layer is between the image sensor array and the pixel unit array and is capable of filtering light with a wavelength range of more than 600 nm; each pixel unit comprises a green sub-pixel unit, a blue sub-pixel unit, and a red sub-pixel unit, in the drive method, lighting the multiple pixel units arranged continuously comprises: lighting green sub-pixel units or blue sub-pixel units in the multiple pixel units, to allow the multiple pixel units to emit green light or blue light.

At least one embodiment of the present disclosure provides a texture recognition device, and the texture recognition device comprises a light source array, an image sensor array, and a controller. The light source array comprises a plurality of sub-light sources; the image sensor array is on a side of the light source array, and comprises a plurality of image sensors, the plurality of image sensors are configured to receive light emitted from the plurality of sub-light sources and then reflected by a texture to the plurality of image sensors for a texture collection; the controller is configured to control the light source array to operate to provide a first photosensitive light source at a first moment, and to control the light source array to operate to provide a second photosensitive light source at the first moment or a second moment different from the first moment, a first imaging range of the first photosensitive light source on the image sensor array partially overlaps with a second imaging range of the second photosensitive light source on the image sensor array.

For example, the texture recognition device provided by at least one embodiment of the present disclosure further comprises a display panel, the display panel comprises a pixel unit array, the pixel unit array comprises a plurality of pixel units; the light source array comprises the pixel unit array, and the plurality of sub-light sources comprise the plurality of pixel units; the controller is configured to light multiple pixel units arranged continuously at the first moment to provide the first photosensitive light source, and to light multiple pixel units arranged continuously at the first moment or at the second moment different from the first moment to provide the second photosensitive light source.

For example, in the texture recognition device provided by at least one embodiment of the present disclosure, the controller is further configured to control the light source array to operate at the first moment to provide a plurality of first photosensitive light sources arranged in an array, and to control the light source array to operate at the first moment or at the second moment different from the first moment to provide a plurality of second photosensitive light sources arranged in an array.

For example, in the texture recognition device provided by at least one embodiment of the present disclosure, each pixel unit comprises a plurality of sub-pixel units that emit light of different colors; the controller is configured to light sub-pixel units, which are capable of emitting light of a same color, in the multiple pixel units at the first moment, to allow the multiple pixel units to emit green light or blue light.

For example, in the texture recognition device provided by at least one embodiment of the present disclosure, the texture recognition device has a touch side, and the image sensor array is on a side of the pixel unit array away from the touch side, the texture recognition device further comprises: a filter layer, between the image sensor array and the pixel unit array, being capable of filtering light with a wavelength range of more than 600 nm.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, narrow bezels have gradually become the mainstream in the design and manufacture of display devices, especially for portable display devices such as mobile phones. One of the methods to achieve the narrow bezel is to integrate an image sensor with a fingerprint recognition function into the display device, thereby achieving the under-screen fingerprint recognition, increasing the area of the display region of the display device, and furthermore increasing the screen ratio.

For example, a point light source, a line light source, or a light source with a certain pattern can be used as a photosensitive light source of the image sensor, to perform fingerprint recognition. Hereinafter, taking a case that a point light source is used as the photosensitive light source of the image sensor as an example to introduce the principle of fingerprint recognition, but this does not constitute limitation on the embodiments of the present disclosure.

Figure 1A:
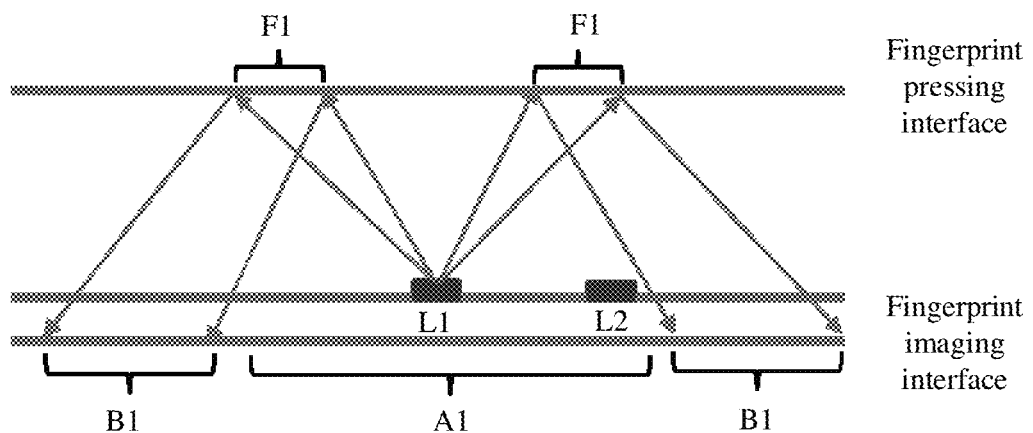
FIG. 1A is a principle diagram of fingerprint imaging.

In a reflective optical fingerprint recognition device, during a process of fingerprint recognition, as shown in FIG. 1A, in a case where the point light source L1 emits light, the light emitted by the point light source illuminates on a fingerprint pressing interface (such as the outer surface of a glass screen) at different angles, because of the total reflection effect of the fingerprint pressing interface, part light, whose incident angle is greater than or equal to a critical angle θ of total reflection, of the light will undergo total reflection, resulting in that the part light cannot exit from the fingerprint pressing interface, thereby generating a total reflection region. Correspondingly, part light, whose incident angle is smaller than the critical angle θ of total reflection, exits from the fingerprint pressing interface. Therefore, the texture image can be collected by the light reflected from the total reflection region, for example, a clear texture image is formed at B1 of a fingerprint imaging interface. This texture image corresponds to the portion at F1 of the fingerprint. F1 is the total reflection region, and B1 is the imaging region (imaging range).

Specifically, in a case where, for example, the fingerprint of the user's finger presses the total reflection region F1, the ridge of the fingerprint touches the surface of the total reflection region F1, so the total reflection condition at the position corresponding to the ridge of the fingerprint is destroyed, therefore, the light will exit at the corresponding position, so that the original reflection path is changed, however, the valley of the fingerprint will not touch the surface of the total reflection region F1, so the total reflection condition of the position corresponding to the valley of the fingerprint is not destroyed, and therefore, the light will still be totally reflected at the corresponding position, so that the original reflection path is not changed. In this way, due to the different effects of the valleys and ridges of the fingerprint on the total reflection condition, the light incident on the fingerprint imaging interface forms a texture image, which has alternative light portions and dark portions at different positions. In addition, due to the interference caused by the light emitted out from the fingerprint pressing interface and reflected by the fingerprint or the like, or because the light emitted by the light source can directly enter the fingerprint imaging interface, A1 of the fingerprint imaging interface becomes a highlight region that is ineffective for detection, and the highlight region cannot form a texture image. Therefore, in order to obtain a complete texture image, a part of the texture image corresponding to the highlight region A1 needs to be additionally detected.

Figure 1B:
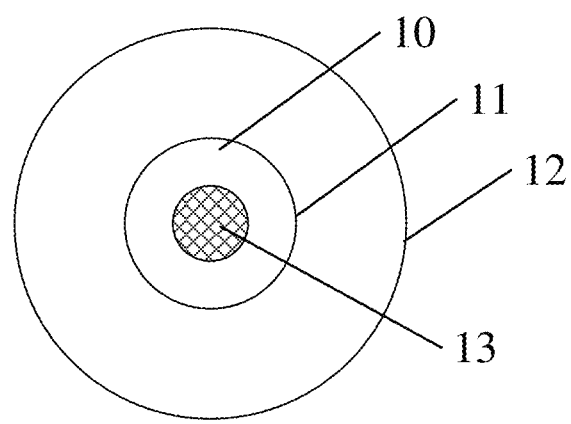
FIG. 1B is a schematic diagram of an imaging range of a point light source.

For example, FIG. 1B shows a diagram of an imaging range of a point light source. As shown in FIG. 1B, the imaging range of the point light source is in a ring shape, and a ring region between an inner circle 11 and an outer circle 12 of the ring shape is the effective imaging region, which corresponds to the imaging region B1 corresponding to the total reflection region F1 in FIG. 1A; the region (hereinafter referred to as the ring center 10) within the inner circle 11 of the ring shape is an imaging ineffective region, which corresponds to the highlight region A1 in FIG. 1A; because a partial region (shaded region) 13 inside the ring center 10 can be directly irradiated by the light source, the partial region is most irradiated by light, and is easy to form an afterimage, hereinafter referred to as an afterimage region. It can be seen that the effective imaging range of one point light source is only the ring region between the inner circle 11 and the outer circle 12, and the imaging range is limited, and in some cases, one point light source cannot meet the requirements of fingerprint recognition.

Figure 1C:
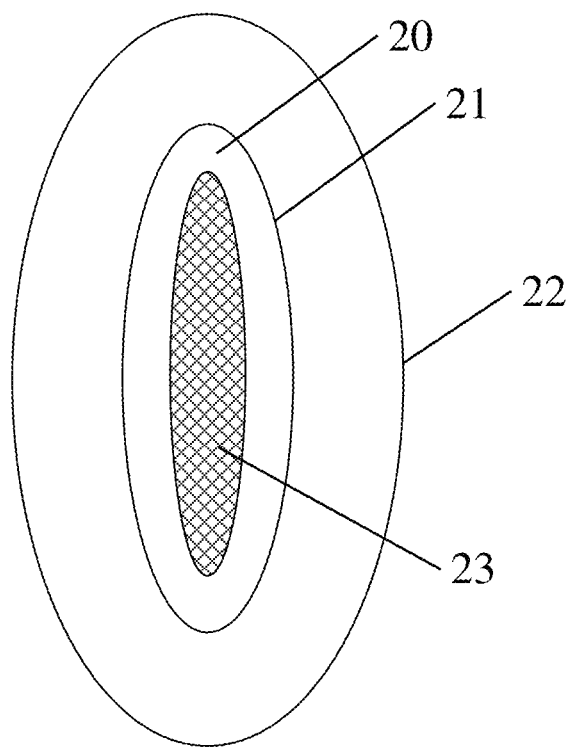
FIG. 1C is a schematic diagram of an imaging range of a line light source.

Similarly, FIG. 1C shows a diagram of an imaging range of a line light source. As shown in FIG. 1C, the effective imaging range for a line light source is only a raceway-shaped ring region or a long oval-shaped ring region between the inner circle 21 and the outer circle 22, and the ring center 20 is an imaging ineffective region, and a partial region (shaded region) 23 inside the annular center 10 is an afterimage region. The imaging range of the raceway-shaped ring region or the long oval-shaped ring region is also limited, and in some cases, one line light source cannot meet the requirements of fingerprint recognition.

At least one embodiment of the present disclosure provides a drive method for a texture recognition device, the texture recognition device comprises a light source array and an image sensor array. The light source array comprises a plurality of sub-light sources; the image sensor array is on a side of the light source array, and comprises a plurality of image sensors, the plurality of image sensors are configured to receive light emitted from the plurality of sub-light sources and then reflected by a texture to the plurality of image sensors for a texture collection; the drive method comprises: at a first moment, the light source array operating to provide a first photosensitive light source, and at the first moment or a second moment different from the first moment, the light source array operating to provide a second photosensitive light source, a first imaging range of the first photosensitive light source on the image sensor array partially overlaps with a second imaging range of the second photosensitive light source on the image sensor array.

Hereinafter, the drive method for the texture recognition device and the texture recognition device provided by the embodiments of the present disclosure will be described in detail with reference to the drawings.

Figure 2:
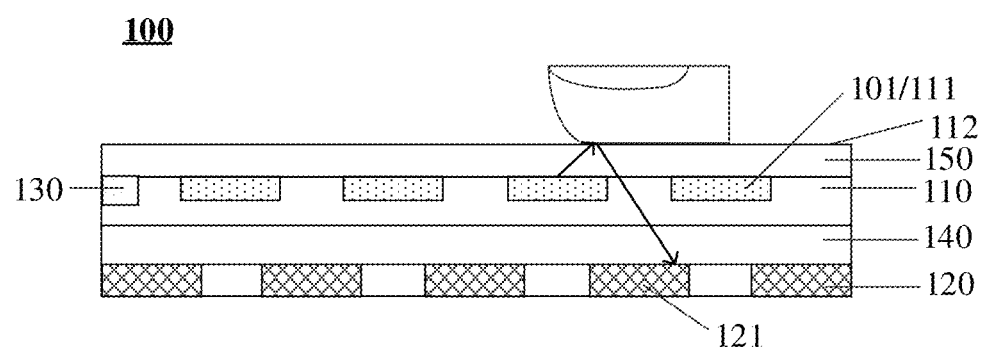
FIG. 2 is a schematic cross-sectional view of a texture recognition device provided by some embodiments of the present disclosure.

FIG. 2 is a schematic cross-sectional view of a texture recognition device 100 provided by some embodiments of the present disclosure. As shown in FIG. 2, the texture recognition device 100 has a touch side 112 (an upper side of the texture recognition device 100 as shown in FIG. 2), and includes a light source array and an image sensor array 120. The texture recognition device 100 can be used for collecting textures, such as fingerprints or palm prints, so as to achieve fingerprint recognition or palm print recognition. For example, the touch side 112 of the texture recognition device includes a touch structure, such as a touch sensor, for detecting touch instructions.

As shown in FIG. 2, the light source array includes a plurality of sub-light sources 111, and these sub-light sources 111 are arranged in an array within a predetermined region. The image sensor array 120 is provided on a side of the light source array, for example, on a side (a lower side in the figure) of the light source array away from the touch side 112, the image sensor array 120 includes a plurality of image sensors 121, these image sensors 121 are arranged in an array within a predetermined region. The plurality of image sensors 121 are configured to be capable of receiving light emitted from the sub-light sources 111 and then reflected by a texture to the image sensors 121 for a texture collection. For example, the light reflected to the image sensors 121 is the light reflected by an operating body having a texture, such as a finger or palm of an operator, to the texture recognition device 100; the plurality of image sensors 121 synthesize to form a required texture image according to the electrical signals generated by the light.

Figure 3A:
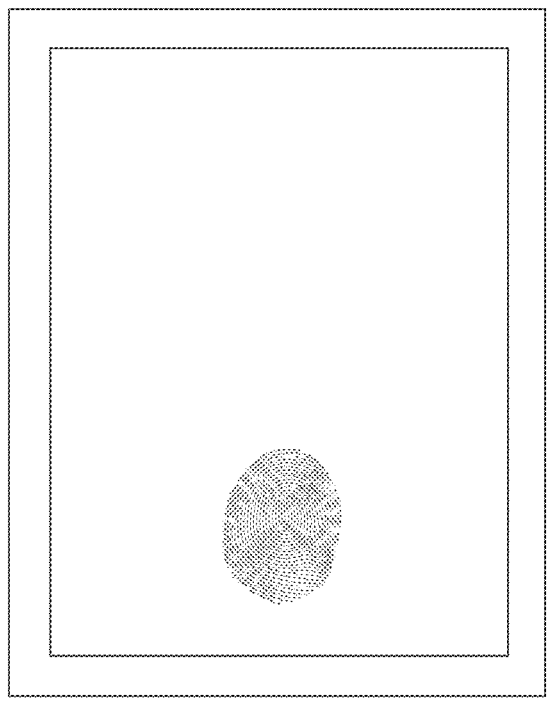
FIG. 3A is a schematic diagram of a texture recognition device touched by a fingerprint according to some embodiments of the present disclosure.

The drive method for the texture recognition device 100 is as follows. In a process when an operating body with a texture such as a finger of an operator touches the touch side 112 of the texture recognition device 100, as shown in FIG. 3A, the texture recognition device 100 starts to collect the texture. In the process of performing texture collection by the texture recognition device 100, as shown in FIG. 3B, at a first moment, the light source array operates to provide a first photosensitive light source 301 (such as a point light source), at the first moment or a second moment different from the first moment, the light source array operates to provide a second photosensitive light source 302 (for example, a point light source), the first photosensitive light source 301 and the second photosensitive light source 302 are spaced apart from each other by a predetermined distance, a first imaging range of the first photosensitive light source 301 on the image sensor array 120 partially overlaps a second imaging range of the second photosensitive light source 302 on the image sensor array 120, that is, the first imaging range and the second imaging range have an overlapping portion, but the first imaging range and the second imaging range do not completely overlap with each other, in this case, the first imaging range and the second imaging range respectively have portions that are not overlapped.

Figure 3B:
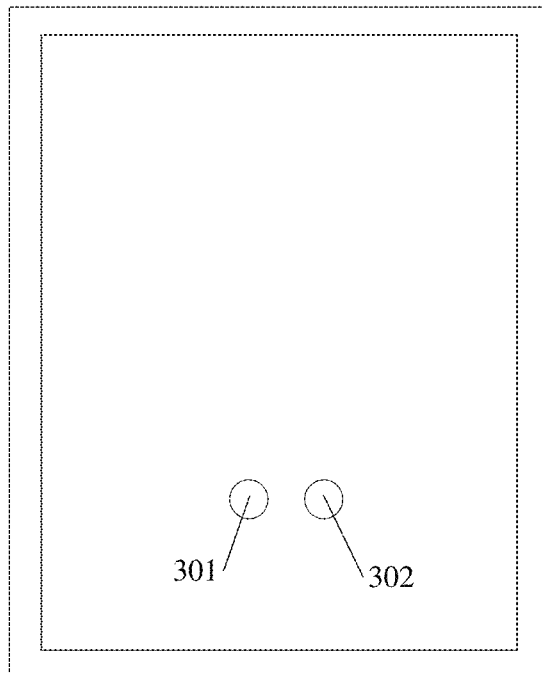
FIG. 3B is a schematic diagram of lighting a photosensitive light source for collecting a texture in a texture recognition device provided by some embodiments of the present disclosure.

For example, as shown in FIGS. 3A and 3B, the sub-light sources 111 under the pressing positions may be selectively lit up according to the pressing positions touched by the operator on the touch side 112 and the pressing forces at different pressing positions, to form the first photosensitive light source 301 and the second photosensitive light source 302. Therefore, the first imaging range provided by the first photosensitive light source 301 and the second imaging range provided by the second photosensitive light source 302 can be spliced with each other to form a texture image with a larger size.

Referring to FIG. 2, the texture recognition device 100 includes, for example, a cover plate 150, and the cover plate 150 is, for example, a glass cover plate, and can encapsulate and protect the texture recognition device 100. For example, the surface of the cover plate 150 is the touch side 112. In a case where an operating body with a texture, such as a finger, touches the touch side 112 of the texture recognition device 100, the light emitted by the sub-light sources 111 may be reflected by the operating body, for example, the light reaches the image sensors 121 through the gaps between the sub-light sources 111 in the light source array, and the image sensors 121 can collect a texture image of the operating body.

As described above, the operating body with a texture may be a hand. In this case, the texture recognized by the image sensors 121 is a skin texture, such as fingerprints, palm prints, etc.; in addition, the operating body with a texture may also be a non-living body with a certain texture, for example, an object with a certain texture made of a material such as resin, and the embodiments of the present disclosure do not specifically limit this.

In the above embodiment, the image sensor array 120 is disposed on the side of the light source array away from the touch side. For example, in other embodiments, the image sensor array 120 and the light source array may also be arranged in the same layer. For example, the plurality of image sensors 121 included in the image sensor array 120 and the sub-light sources 111 are arranged alternately in the same layer. For another example, the light source array may be disposed on the side of the image sensor array 120 away from the touch side. In this case, the light emitted by the sub-light sources 111 may be emitted out from the gaps between adjacent image sensors 121 and then reflected to the image sensors 121 by the texture. The embodiments of the present disclosure do not specifically limit the arrangement of the image sensor array 120 and the light source array, as long as the plurality of image sensors 121 can receive the light emitted from the sub-light sources 111 and then reflected by the texture to the image sensors 121 for the texture collection.

For example, in some embodiments, the texture recognition device 100 is a display screen with an under-screen texture recognition function, and accordingly includes a display panel 110, the display panel 110 includes a pixel unit array, and the pixel unit array includes a plurality of pixel units 101. For example, the pixel unit array of the display panel 110 is used to be implemented as the light source array, and the plurality of pixel units 101 are implemented as the plurality of sub-light sources 111. That is, the pixel units 101 of the display panel 110 also serve as photosensitive light sources, so that the compactness of the device can be improved and the arrangement difficulty of each functional structure can be reduced. In this case, the drive method of the texture recognition device 100 includes: during the process of performing the texture collection by the image sensor array 120, at the first moment, lighting a plurality of pixel units 101 arranged continuously to form a first photosensitive light source (such as a point light source), at the first moment or a second moment different from the first moment, lighting a plurality of pixel units 101 arranged continuously to form a second photosensitive light source (for example, a point light source). For example, the pixel units 101 in the entire display region of the display panel 110 can be controlled to serve as the photosensitive light sources, and the image sensor array 120 can also be arranged under the entire display region accordingly, thereby achieving the full-screen texture recognition.

In other embodiments, a display screen with an under-screen texture recognition function includes a display panel 110 and separately provided light-emitting devices, and the separately provided light-emitting devices serve as photosensitive light sources for achieving texture recognition. These light-emitting devices are, for example, arranged between adjacent pixel units in the pixel unit array, or overlap with the pixel units. The embodiments of the present disclosure do not limit the specific form of the light source array.

Figure 4A:
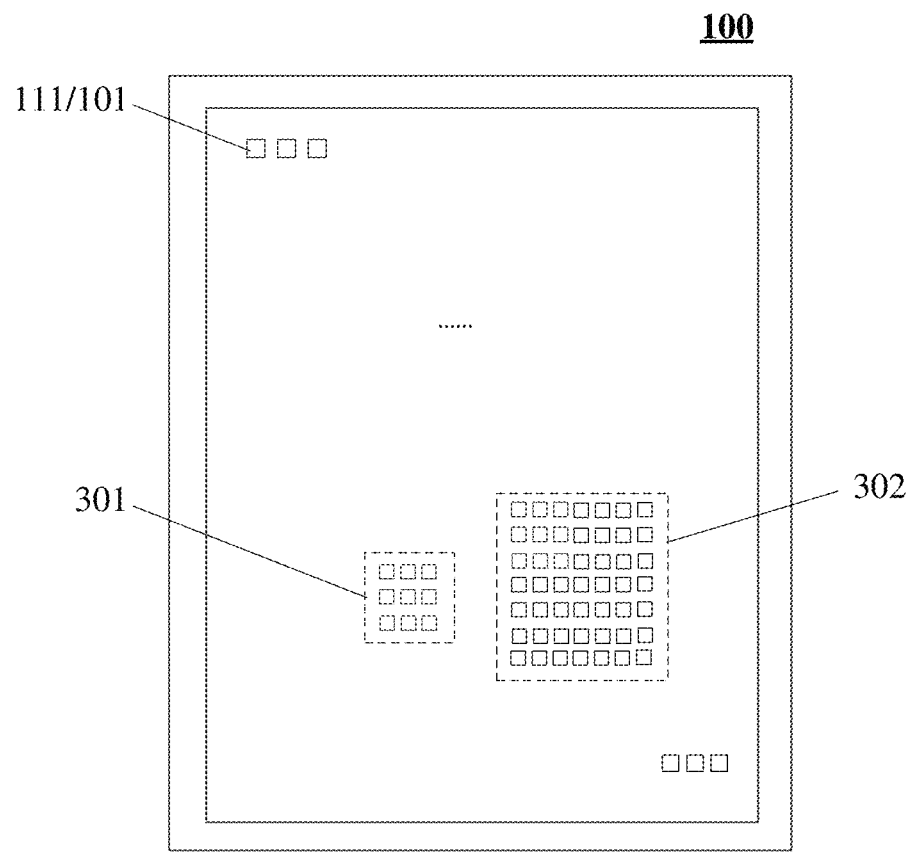
FIG. 4A is a schematic diagram of lighting a photosensitive light source in a texture recognition device provided by some embodiments of the present disclosure.
Figure 4B:
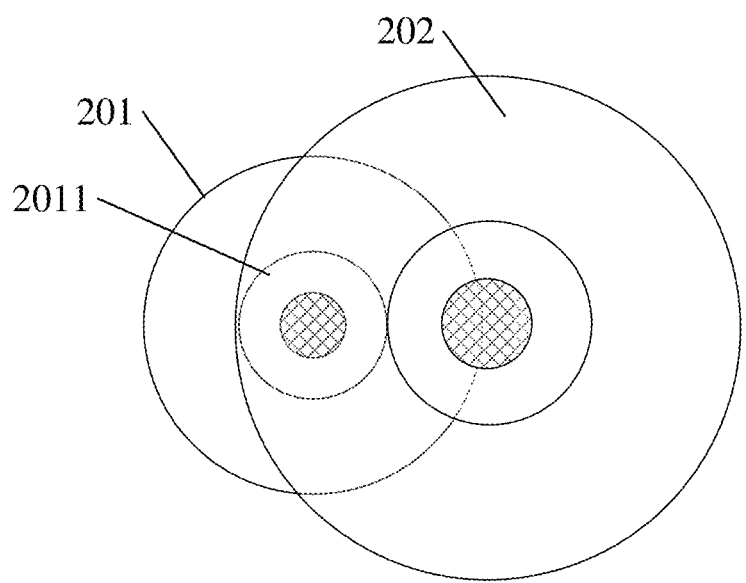
FIG. 4B is a schematic diagram of an imaging range of a photosensitive light source on an image sensor array in a texture recognition device provided by some embodiments of the present disclosure.

For example, in some embodiments, as shown in FIG. 4A, the first photosensitive light source 301 includes at least one sub-light source 111 (in a case where the texture recognition device 100 is a display screen with an under-screen texture recognition function, the sub-light source 111 may be the pixel unit 101), the second photosensitive light source 302 includes a plurality of sub-light sources 111. In a case where the second photosensitive light source 302 is provided at the second moment, the number of the sub-light sources included in the second photosensitive light source 302 is more than the number of the sub-light sources included in the first photosensitive light source 301. For example, the first photosensitive light source 301 is formed as a small point light source, and the second photosensitive light source 302 is formed as a large point light source. These point light sources may be in a circular shape or a square shape, and accordingly, a diameter (in the case of a circular shape) or width (in a case of a square shape) of the second photosensitive light source 302 is larger than a diameter or width of the first photosensitive light source 301. For example, as shown in FIG. 4B, the first imaging range 201 of the first photosensitive light source 301 is in a first ring shape, and the second imaging range 202 of the second photosensitive light source 302 is in a second ring shape, the second ring shape at least partially covers a ring center portion 2011 of the first ring shape. For example, in one embodiment, the second ring shape completely covers the ring center portion 2011 of the first ring shape.

For example, in some examples, the first photosensitive light source 301 and the second photosensitive light source 302 do not overlap with each other, that is, do not have the same sub-light source; in other examples, the first photosensitive light source 301 and the second photosensitive light source may partially overlap with each other, that is, include the same sub-light source. For example, the distance between the first photosensitive light source 301 and the second photosensitive light source 302 can be selected according to the distance between the light source array and the touch side 112 and the distance between the image sensor array and the touch side 112, etc., as long as the imaging range of the first photosensitive light source 301 and the imaging range of the second photosensitive light source 302 on the image sensor array satisfy the above relationship, and the embodiments of the present disclosure do not limit this.

For another example, the first photosensitive light source 301 is formed as a small line light source, and the second photosensitive light source 302 is formed as a large line light source, a length of the first photosensitive light source 301 is equal to a length of the second photosensitive light source 302, but a width of the second photosensitive light source 302 is greater than a width of the first photosensitive light source 301. In this case, the first imaging range of the first photosensitive light source 301 is in a first ring shape, and the second imaging range of the second photosensitive light source 302 is in a second ring shape. The second ring shape at least partially covers a ring center portion of the first ring shape, or the second ring shape completely covers the ring center portion of the first ring shape.

Because the ring center portion 2011 of the first imaging range 201 is an imaging ineffective region, a clear texture image cannot be formed in the imaging ineffective region. For example, in the process of forming the texture image, the texture image corresponding to the ring center portion will be removed, so as to prevent the texture image in the ring center portion from overlapping with the texture image formed later to form an afterimage. After that, because the effective imaging region of the second imaging range 202, that is, the second ring shape, covers the ring center portion 2011 of the first ring shape, the texture image formed by the second imaging range 202 can supplement the missing partial texture image in the first imaging range 201. Therefore, the first imaging range 201 and the second imaging range 202 can jointly form a texture image with a larger size.

For example, the number of sub-light sources included in the second photosensitive light source 302 provided at the second moment is 2-3 times the number of sub-light sources included in the first photosensitive light source 301 provided at the first moment. For example, the first photosensitive light source 301 includes (2×2)~(5×5) sub-light sources arranged in an array, and the second photosensitive light source 302 includes (6×6)~(9×9) sub-light sources arranged in an array. For example, in one example, the first photosensitive light source 301 includes 3×3 sub-light sources arranged in an array, for example, includes 9 sub-pixel units arranged in three rows and three columns; the second photosensitive light source 302 includes 7×7 sub-light sources arranged in an array, for example, includes 49 sub-pixel units arranged in seven rows and seven columns. In this case, the second ring shape may more cover the ring center portion 2011 of the first ring shape, for example, completely cover the ring center portion 2011 of the first ring shape, thereby obtaining a larger imaging range.

For example, in some examples, the texture image formed by the first imaging range 201 and the second imaging range 202 can be cut to form a rectangular texture image with a size of 4 mm×6 mm, which is convenient for being matched with the target image to perform texture recognition. Moreover, there is no afterimage in the texture image, so that the accuracy of the texture image can be improved.

Figure 5A:
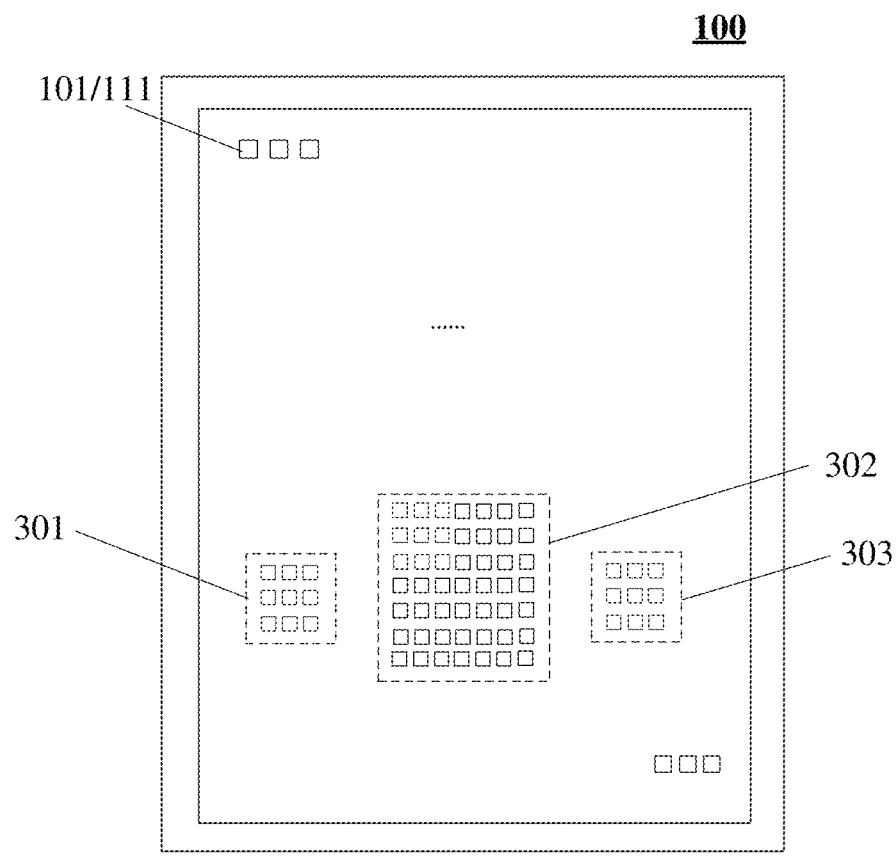
FIG. 5A is a schematic diagram of lighting a photosensitive light source in a texture recognition device provided by some embodiments of the present disclosure.
Figure 5B:
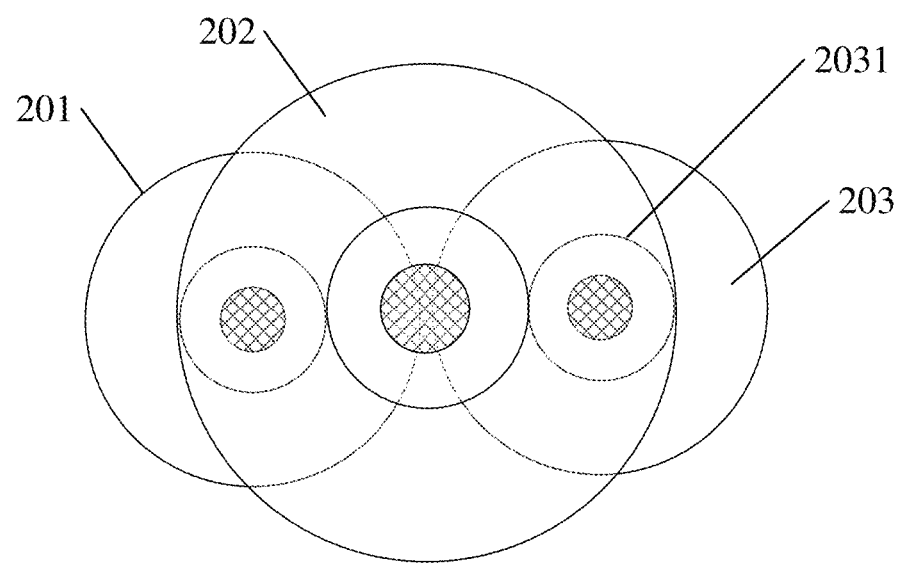
FIG. 5B is a schematic diagram of an imaging range of a photosensitive light source on an image sensor array in a texture recognition device provided by some embodiments of the present disclosure.

For example, in some embodiments, on the basis of the example shown in FIG. 4A, as shown in FIG. 5A, at the first moment, the light source array also operates to provide a third photosensitive light source 303, the third photosensitive light source 303 includes at least one sub-light source 111 (or at least one pixel unit 101). That is, in FIG. 5A, the first photosensitive light source 301 and the third photosensitive light source 303 are provided at the first moment, and the second photosensitive light source 302 is provided at the second moment. For example, the number of sub-light sources included in the third photosensitive light source 303 is equal to the number of sub-light sources included in the first photosensitive light source 301, for example, the third photosensitive light source 303 is equivalent to the first photosensitive light source 301, and except for the position, the other parts of the third photosensitive light source 303 are the same as those of the first photosensitive light source 301. The number of the sub-light sources included in the second photosensitive light source 302 is more than the number of the sub-light sources included in the first photosensitive light source 301, and is more than the number of the sub-light sources included in the third photosensitive light source 303. For example, the first photosensitive light source 301 and the third photosensitive light source 303 are formed as two small point light sources, and the second photosensitive light source 302 is formed as a large point light source. For example, the second photosensitive light source 302 is between the first photosensitive light source 301 and the third photosensitive light source 303, and the centers of the three photosensitive light sources are on the same straight line, the distance between the center of the first photosensitive light source 301 and the center of the second photosensitive light source 302 is equal to the distance between the center of the second photosensitive light source 302 and the center of the third photosensitive light source 303, that is, the first photosensitive light source 301 and the third photosensitive light source 30 are symmetrically distributed with respect to the second photosensitive light source 302. As shown in FIG. 5B, a third imaging range 203 of the third photosensitive light source 303 on the image sensor array is in a third ring shape, the second ring shape 202 also at least partially covers the ring center portion 2031 of the third ring shape. For example, in one embodiment, the second ring shape completely covers the ring center portion 2031 of the third ring shape.

Similarly, because the ring center portion 2031 of the third imaging range 203 is an imaging ineffective region, a clear texture image cannot be formed in the imaging ineffective region. For example, in the process of forming the texture image, the texture image corresponding to the ring center portion will be removed, so as to prevent the texture image in the ring center portion from overlapping with the texture image formed later to form an afterimage. After that, because the effective imaging region of the second imaging range 202, that is, the second ring shape, covers the ring center portion 2031 of the third ring shape, the texture image formed by the second imaging range 202 can supplement the missing partial texture image in the third imaging range 203. Therefore, a larger imaging range can be obtained.

For example, the number of sub-light sources included in the second photosensitive light source 302 provided at the second moment is 2-3 times the number of sub-light sources included in the first photosensitive light source 301 provided at the first moment and is 2-3 times the number of sub-light sources included in the third photosensitive light source 303 provided at the first moment. For example, each of the first photosensitive light source 301 and the third photosensitive light source 303 includes (2×2)~(5×5) sub-light sources arranged in an array, and the second photosensitive light source 302 includes (6×6)~(9×9) sub-light sources arranged in an array. For example, in one example, each of the first photosensitive light source 301 and the third photosensitive light source 303 includes 3×3 sub-light sources arranged in an array, and the second photosensitive light source 302 includes 7×7 sub-light sources arranged in an array. Therefore, the second ring shape can more cover the ring center portion 2011 of the first ring shape and the ring center portion 2031 of the third ring shape, for example, the second ring shape completely covers the ring center portion 2011 of the first ring shape and the ring center portion 2031 of the third ring shape, thereby obtaining a larger imaging range.

For example, in some examples, the texture image formed by the first imaging range 201, the second imaging range 202, and the third imaging range 203 can be cut to form a rectangular texture image with a size of 4 mm×6 mm, so that the texture image in a larger range can be obtained within the same time to facilitate being matched with the target image to achieve texture recognition. Moreover, there is no afterimage in the texture image, so that the accuracy of the texture image can be improved.

Figure 6A:
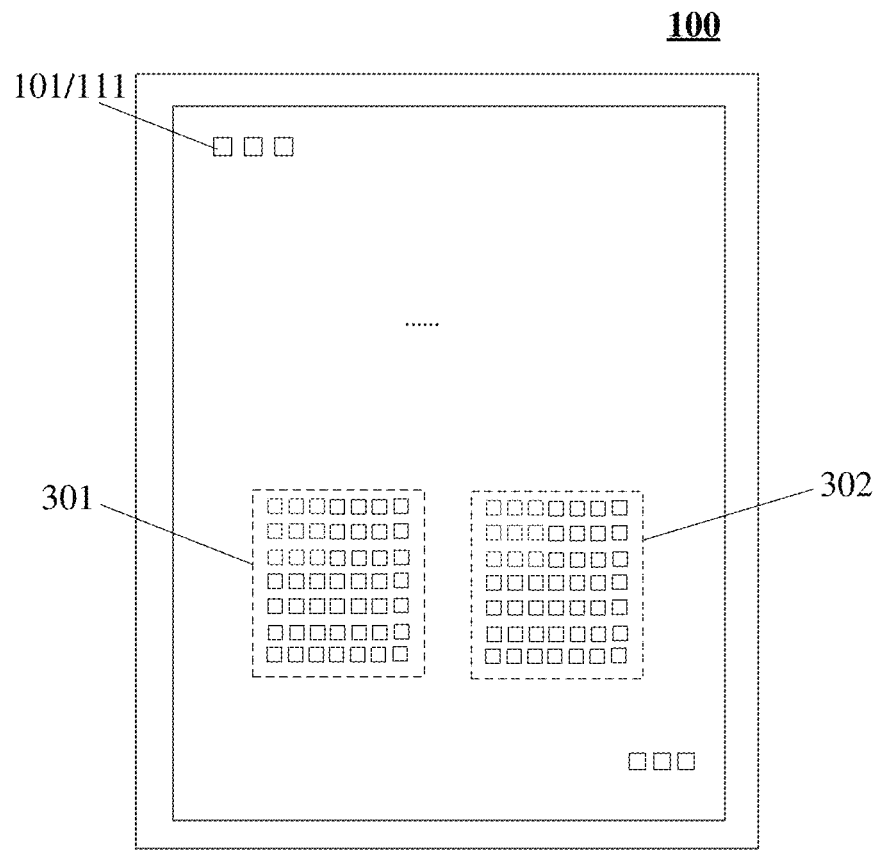
FIG. 6A is a schematic diagram of lighting a photosensitive light source in a texture recognition device provided by some embodiments of the present disclosure.
Figure 6B:
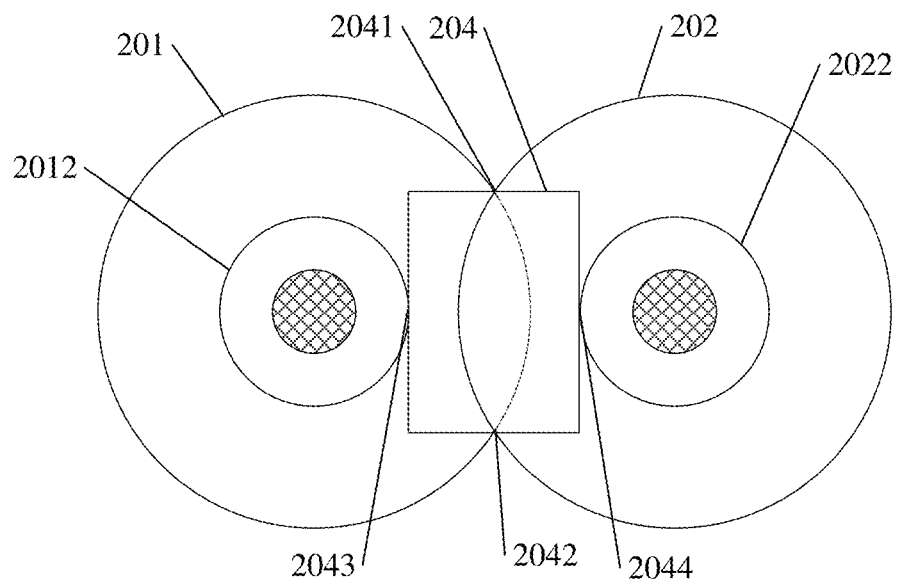
FIG. 6B is a schematic diagram of an imaging range of a photosensitive light source on an image sensor array in a texture recognition device provided by some embodiments of the present disclosure.

For example, in some embodiments, as shown in FIG. 6A, the first photosensitive light source 301 includes at least one sub-light source 111 (in a case where the texture recognition device 100 is a display screen with an under-screen texture recognition function, the sub-light source 111 may be the pixel unit 101), the second photosensitive light source includes at least one sub-light source 111. In the case where the second photosensitive light source 302 is provided at the first moment, that is, in a case where the first photosensitive light source 301 and the second photosensitive light source 302 are simultaneously provided at the first moment, the number of sub-light sources included in the second photosensitive light source 302 is equal to the number of sub-light sources included in the first photosensitive light source 301. Similarly, the second photosensitive light source 302 is equivalent to the first photosensitive light source 301, and except for the position, the other parts of the second photosensitive light source 302 are the same as those of the first photosensitive light source 301. As shown in FIG. 6B, the first imaging range 201 of the first photosensitive light source 30 is in a first ring shape, the second imaging range 202 of the second photosensitive light source 302 is in a second ring shape, the first ring shape and the second ring shape have only two intersections 2041 and 2042, two closest points, which are on an inner circle 2012 of the first ring shape and an inner circle 2022 of the second ring shape, respectively, are a first point 2043 and a second point 2044, a rectangular imaging range formed by taking the two intersections 2041 and 2042, the first point 2043, and the second point 2044 as centers of four sides of the rectangular imaging range is used to image the texture.

For example, in a process when the first ring shape and the second ring shape are getting closer to each other, the distance between the intersection points 2041 and 2042 of the first ring shape and the second ring shape becomes larger and larger, while the distance between the first point 2043 and the second point 2044 becomes smaller and smaller, so that the size of the rectangular imaging range 204 has a maximum value. For example, the degree to which the first ring shape and the second ring shape overlap with each other allows the size of the rectangular imaging range 204 to be the largest, thereby a larger texture image can be obtained.

For example, each of the first photosensitive light source 301 and the second photosensitive light source 302 includes (6×6)~(9×9) sub-light sources arranged in an array. For example, in one example, each of the first photosensitive light source 301 and the second photosensitive light source 302 includes 7×7 sub-light sources arranged in an array. Thus, a texture image with a larger size can be obtained. For example, in one example, the size of the rectangular texture image formed by cutting is 2 mm×4 mm. The rectangular texture image is used to be matched with the target image to achieve texture recognition, and there is no afterimage in the rectangular texture image, thereby improving the accuracy of texture recognition.

For example, in one example, as shown in FIG. 6B, except that the rectangular imaging range 204 is used for imaging the texture, a ring portion of the first ring shape and a ring portion of the second ring shape, that is, the portions indicated by reference numerals 201 and 202, are also used for imaging the texture. Thus, a texture image with a larger size and having a shape close to the number "8" shape can be obtained.

Figure 7A:
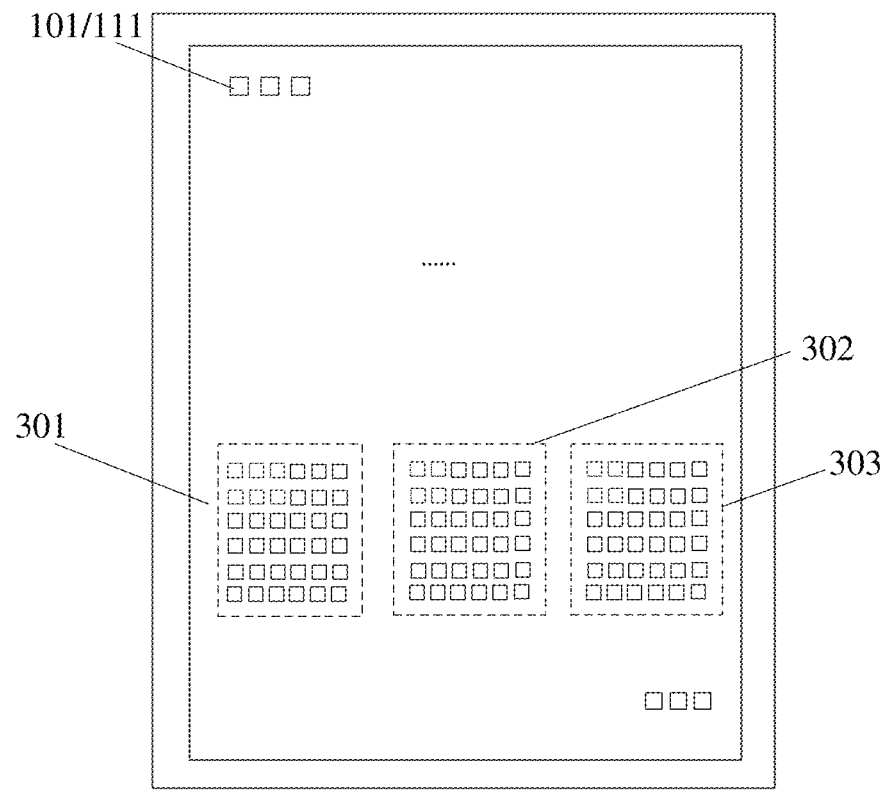
FIG. 7A is a schematic diagram of lighting a photosensitive light source in a texture recognition device provided by some embodiments of the present disclosure.
Figure 7B:
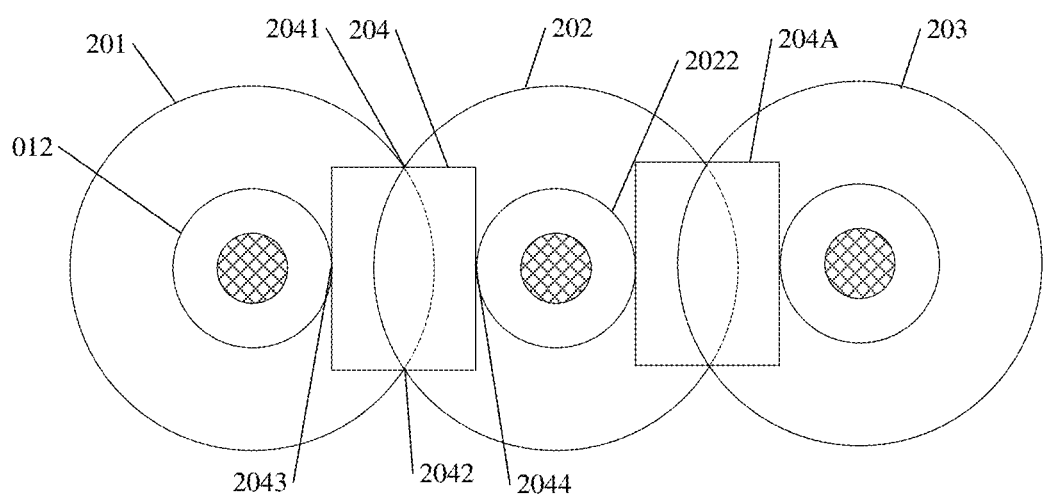
FIG. 7B is a schematic diagram of an imaging range of a photosensitive light source on an image sensor array in a texture recognition device provided by some embodiments of the present disclosure.

For example, in some embodiments, based on the example shown in FIG. 6A, as shown in FIG. 7A, a third photosensitive light source 303 is also provided at the first moment, that is, the first photosensitive light source 301, the second photosensitive light source 302, and the third photosensitive light source 303 are simultaneously provided at the first moment. For example, the number of sub-light sources included in the third photosensitive light source 303, the number of sub-light sources included in the second photosensitive light source 302, and the number of sub-light sources included in the first photosensitive light source 301 are equal. For example, the third photosensitive light source 303 is equivalent to the first photosensitive light source 301 and the second photosensitive light source 302. Relative to the first photosensitive light source 301, the third photosensitive light source 303 is on the other side of the second photosensitive light source 302, the centers of the first photosensitive light source 301, the second photosensitive light source 302, and the third photosensitive light source 303 are on the same straight line, and for example, the distance between the center of the first photosensitive light source 301 and the center of the second photosensitive light source 302 is equal to the distance between the center of the second photosensitive light source 302 and the center of the third photosensitive light source 303. Therefore, as shown in FIG. 7B, the imaging range of the second photosensitive light source 302 and the imaging range of the third photosensitive light source 303 can also form a rectangular imaging range 204A for imaging the texture.

For example, the degree to which the second ring shape and the third ring shape overlap with each other is the same as the degree to which the first ring shape and the second ring shape overlap with each other. For example, each of the first photosensitive light source 301, the second photosensitive light source 302, and the third photosensitive light source 303 includes (6×6)~(9×9) sub-light sources arranged in an array. For example, in one example, each of the first photosensitive light source 301, the second photosensitive light source 302, and the third photosensitive light source 303 includes 7×7 sub-light sources arranged in an array. Thus, a texture image with a larger size can be obtained. For example, in one example, the imaging ranges of the first photosensitive light source 301, the second photosensitive light source 302, and the third photosensitive light source 303 are cut to form two rectangular texture images, and each rectangular texture image has a size of 2 mm×4 mm.

Figure 8A:
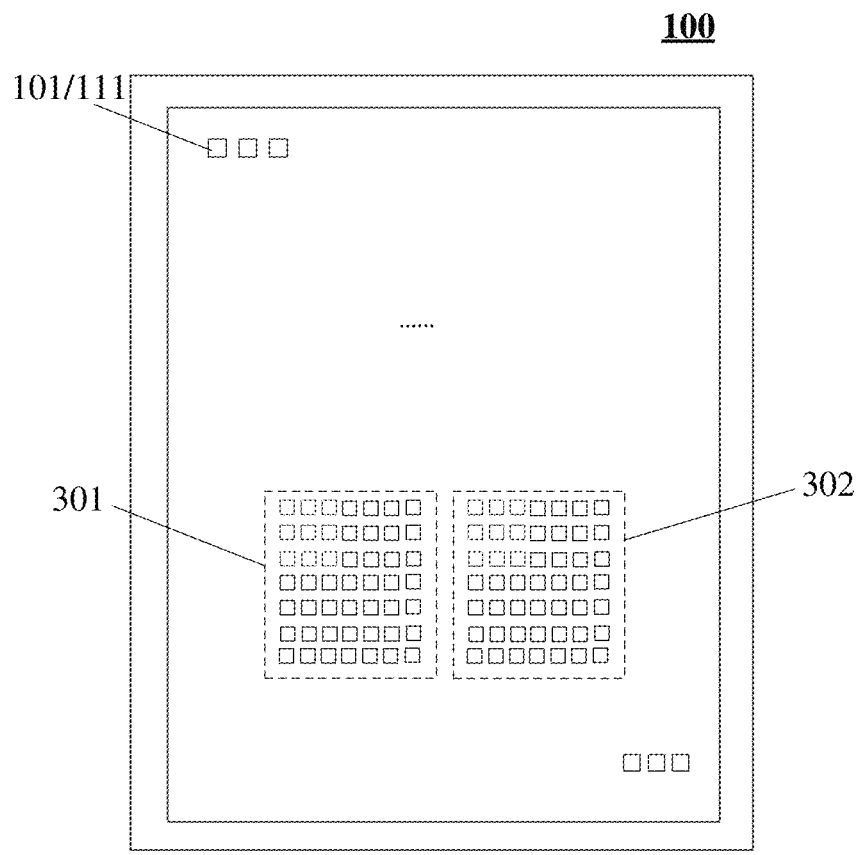
FIG. 8A is a schematic diagram of lighting a photosensitive light source in a texture recognition device provided by some embodiments of the present disclosure.
Figure 8B:
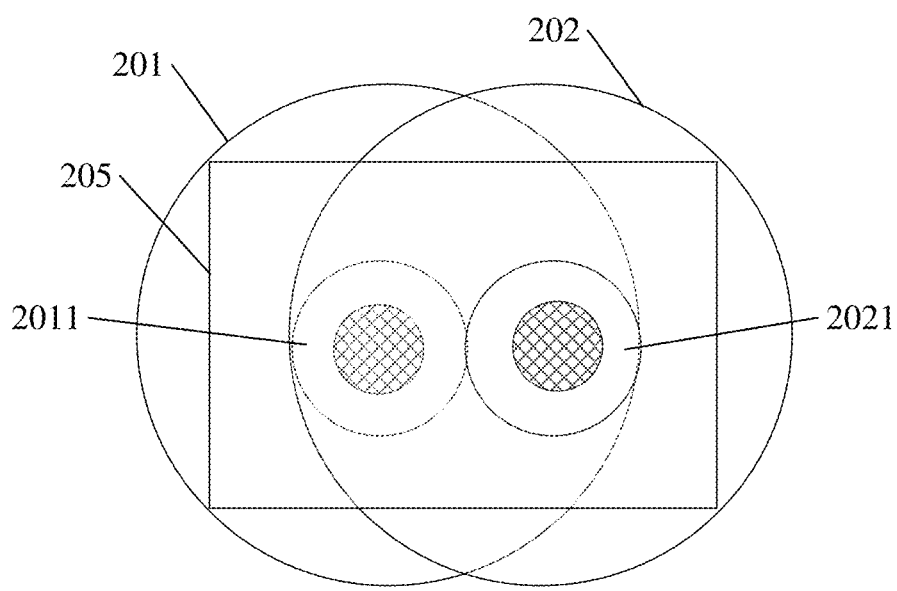
FIG. 8B is a schematic diagram of an imaging range of a photosensitive light source on an image sensor array in a texture recognition device provided by some embodiments of the present disclosure.

For example, in some embodiments, as shown in FIG. 8A, the first photosensitive light source 301 includes at least one sub-light source 111 (in a case where the texture recognition device 100 is a display screen with an under-screen texture recognition function, the sub-light source 111 may be the pixel unit 101), the second photosensitive light source 302 includes at least one sub-light source 111. In a case where the second photosensitive light source 302 is provided at the second moment, the number of sub-light sources included in the second photosensitive light source 302 is equal to the number of sub-light sources included in the first photosensitive light source 301 provided at the first moment. As shown in FIG. 8B, the first imaging range 201 of the first photosensitive light source 301 is in a first ring shape, and the second imaging range 202 of the second photosensitive light source 302 is in a second ring shape. The second ring shape at least partially covers the ring center portion 2011 of the first ring shape, and the first ring shape at least partially covers the ring center portion 2021 of the second ring shape, an imaging range, such as a rectangular imaging range 205, formed within the range (including the range covered by any one of the first ring shape and the second ring shape) covered by the first ring shape and the second ring shape is used for imaging texture.

Similarly, because the ring center portion 2011 of the first imaging range 201 and the ring center portion 2021 of the second ring shape are ineffective regions, a clear texture image cannot be formed in the ineffective regions. For example, in the process of forming the texture image, the texture images corresponding to the ring center portion 2011 and the ring center portion 2021 will be removed, so as to prevent the texture images in the ring center portions from overlapping with the other texture images to form afterimages. After that, because the second ring shape covers the ring center portion 2011 of the first ring shape, and the first ring shape covers the ring center portion 2021 of the second ring shape, the texture image formed by the first imaging range 201 and the texture image formed by the second imaging range 202 complement each other, thereby jointly forming a texture image with a larger size.

For example, a rectangular imaging range 205 can be formed by cutting the range jointly covered by the first ring shape and the second ring shape. Similarly, the rectangular imaging range 205 also has the largest size. For example, the degree to which the first ring shape and the second ring shape overlap with each other allows the size of the rectangular imaging range 205 to be the largest, and therefore a larger texture image can be obtained.

For example, each of the first photosensitive light source 301 and the second photosensitive light source 302 includes (6×6)~(9×9) sub-light sources arranged in an array. For example, in one example, each of the first photosensitive light source 301 and the second photosensitive light source 302 includes 7×7 sub-light sources arranged in an array. Thus, a texture image with a larger size can be obtained. For example, in one example, the size of the rectangular texture image 205 formed by cutting is 3 mm×4 mm.

Figure 8C:
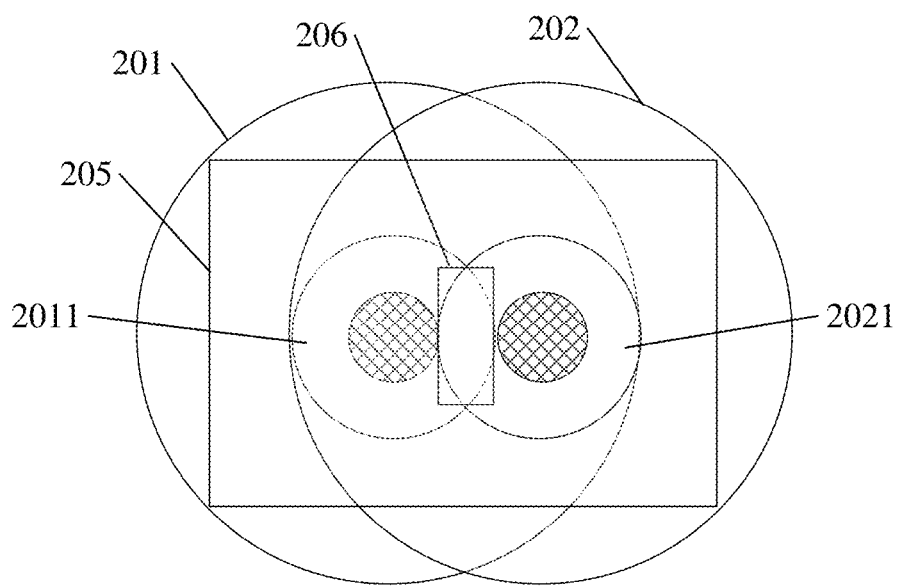
FIG. 8C is a schematic diagram of an imaging range of a photosensitive light source on an image sensor array in a texture recognition device provided by some embodiments of the present disclosure.

For example, in some examples, as shown in FIG. 8C, the ring center portion 2011 of the first ring shape and the ring center portion 2021 of the second ring shape have an overlapping portion, a texture image cannot be formed on the overlapping portion, so that this overlapping portion can be removed in the process of forming the texture image, for example, the rectangular portion 206 is removed, thereby forming an imaging range, which is in a shape of a Chinese character "回", to image the texture. For example, in one example, the size of the texture image corresponding to the removed rectangular portion 206 is 0.5 mm×0.5 mm.

Figure 8D:
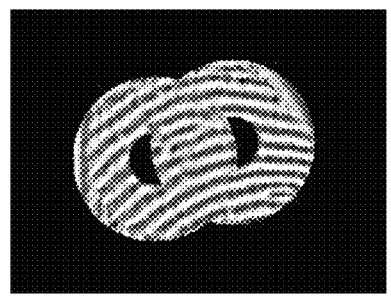
FIG. 8D is a texture image obtained by a texture recognition device provided by some embodiments of the present disclosure.

For example, in some examples, the second ring shape partially covers the ring center portion 2011 of the first ring shape, and the first ring shape partially covers the ring center portion 2021 of the second ring shape. In this case, the range covered by the first ring shape and the second ring shape can form a texture image as shown in FIG. 8D. The texture image can be directly used for texture recognition, or a rectangular texture image can be formed by cutting the texture image, and then texture recognition can be performed on the rectangular texture image.

For example, in the example shown in FIG. 8A, the distance between the two photosensitive light sources that are lit is closer than the distance between the two photosensitive light sources that are lit in the example shown in FIG. 6, and therefore the overlapping degree of the imaging ranges of the two photosensitive light sources is greater. In the example shown in FIG. 8A, the two photosensitive light sources that are lit do not overlap with each other, that is, do not have the same sub-light source. In other examples, according to the distance between the light source array and the image sensor array and the distance between the light source array and the surface of the touch side of the texture recognition device, the two photosensitive light sources that are lit may also partially overlap with each other, that is, the two photosensitive light sources include several identical sub-light sources, and the embodiments of the present disclosure do not specifically limit the lighting method of the sub-light sources.

For example, in some embodiments, in a case where the size of the texture pressing on the touch side 112 of the texture recognition device is relatively large, for example, in a case where the finger pressing on the touch side 112 of the texture recognition device is the thumb, a larger imaging range can be obtained by providing a plurality of photosensitive light sources at one moment.

For example, in one embodiment, as shown in FIG. 2, the texture recognition device 100 has a touch side 112, and the drive method for the texture recognition device 100 may further include: detecting a contact area between the texture and the touch side 112, in a case where the contact area is greater than a threshold area, providing a plurality of first photosensitive light sources arranged in an array at the first moment and providing a plurality of second photosensitive light sources arranged in an array at the first moment or at the second moment different from the first moment to image the texture. The embodiments of the present disclosure do not limit the method of acquiring the contact area and the size of the threshold area. For example, in some examples, the texture recognition device 100 includes a touch structure, so that the contact area between the texture and the touch side can be obtained through the touch structure. For example, the threshold area can be set according to an operating body (such as a finger) that provides the texture, for example, the threshold area may be set to 1 cm×1 cm, and the like. Thus, the texture recognition device 100 can acquire a texture image of a corresponding size according to the contact area, so as to facilitate the texture recognition.

Figure 9:
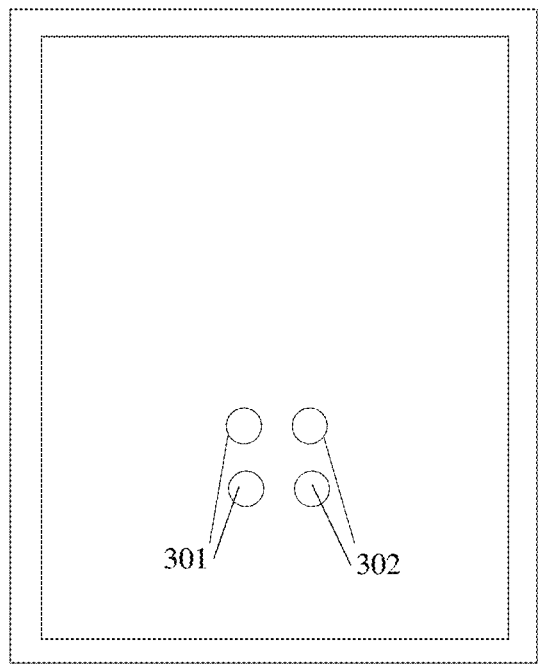
FIG. 9 is a schematic diagram of lighting a plurality of photosensitive light sources for collecting a texture in a texture recognition device provided by some embodiments of the present disclosure.

For example, as shown in FIG. 9, at the first moment, a plurality of first photosensitive light sources 301 (two first photosensitive light sources shown in the figure) arranged in an array are provided; and at the first moment or at a second moment different from the first moment, a plurality of second photosensitive light sources 302 (two second photosensitive light sources shown in the figure) arranged in an array are provided. Thus, a texture image in a larger range can be obtained. In other embodiments, according to situations, there may be more first photosensitive light sources 301 and more second photosensitive light sources 302 provided, and a plurality of third photosensitive light sources 303 may also be provided, which is not limited in the embodiments of the present disclosure.

For example, in one embodiment, continuing to refer to FIG. 2, the texture recognition device 100 has a touch side 112, and the drive method for the texture recognition device 100 may further include: detecting a contact area between the texture and the touch side 112, respectively determining the number of sub-light sources comprised in the first photosensitive light source and the number of sub-light sources comprised the second photosensitive light source according to the contact area, and providing a plurality of first photosensitive light sources arranged in an array at the first moment and providing a plurality of second photosensitive light sources arranged in an array at the first moment or at the second moment different from the first moment to image the texture. For example, in a case where the contact area is relatively large, the number of sub-light sources comprised in the first photosensitive light source and the number of sub-light sources comprised in the second photosensitive light source are large, for example, the first photosensitive light source and the second photosensitive light source are both formed as large point light sources, for example, are formed as 7×7 sub-light sources in an array, and in some examples, the third photosensitive light source (s) may also be provided. In a case where the contact area is relatively small, the number of sub-light sources included in the first photosensitive light source and the number of sub-light sources comprised in the second photosensitive light source are small, for example, the first photosensitive light source and the second photosensitive light source are formed as a large point light source and a small point light source as shown in FIG. 3A, respectively. Therefore, the supply mode of the photosensitive light sources shown in, for example, FIG. 4A, FIG. 5A, FIG. 6A, FIG. 7A, and FIG. 8A, can be selected according to the contact area.

Figure 10:
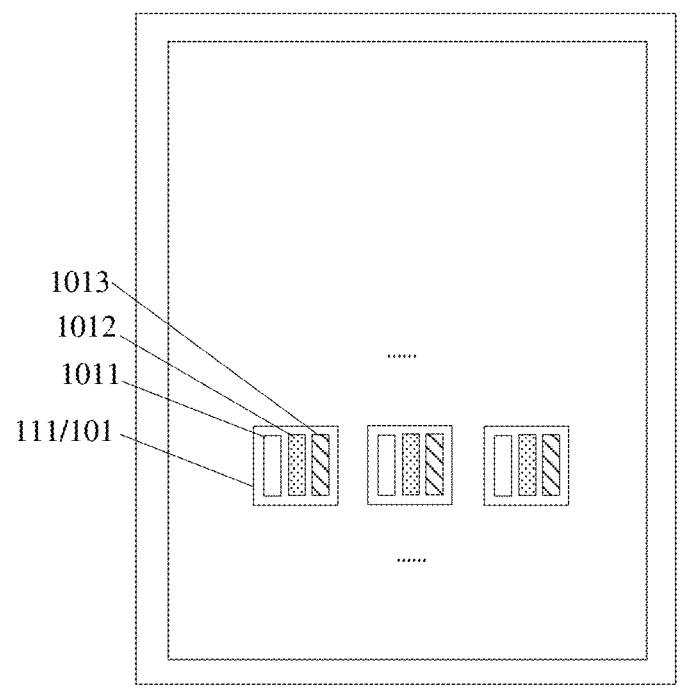
FIG. 10 is a schematic diagram of a pixel unit in a texture recognition device provided by some embodiments of the present disclosure.

For example, in some embodiments, in a case where the texture recognition device 100 is a display screen with an under-screen texture recognition function, as shown in FIG. 10, each pixel unit 101 of the display panel 110 includes a plurality of sub-pixel units that can emit light of different colors, for example, includes a red sub-pixel unit 1011, a green sub-pixel unit 1012, and a blue sub-pixel unit 1013. In this case, lighting the plurality of pixel units 101 arranged continuously may include: lighting sub-pixel units, which are capable of emitting light of a same color, in the plurality of pixel units 101, to allow the plurality of pixel units to emit monochromatic light of the same color.

For example, in a case of lighting a plurality of pixel units 101 to form a photosensitive light source, only the red sub-pixel units 1011 in the plurality of pixel units 101 may be lit, only the green sub-pixel units 1012 in the plurality of pixel units 101 may be lit, or only the blue sub-pixel units 1013 in the plurality of pixel units 101 may be lit. Thus, the photosensitive light source formed is a monochromatic light source. Compared with a case where the pixel units 101 are lit entirely, the monochromatic light source can reduce the brightness of the photosensitive light source, so as to prevent the photosensitive light source from directly illuminating the image sensor to form an afterimage region with too large range and too high brightness. That is, the monochromatic light source can reduce the afterimage region formed by the photosensitive light source on the image sensor array 120, thereby avoiding the afterimage of the afterimage region from adversely affecting the texture image formed subsequently.

For example, in the process of fingerprint recognition, except the light emitted by the light source array can be sensed by the image sensor array, the image sensor array may also sense the ambient light incident through the finger. Because the image sensor receives light passively, and will not actively distinguish the light emitted by the light source array from the ambient light. Therefore, the ambient light may interfere with the fingerprint recognition on the image sensor. For example, in a case where the ambient light is illuminated directly above the finger, the ambient light can penetrate the finger and stimulate biological tissue in the finger to emit pigment light, the pigment light may interfere with fingerprint recognition. Through detection, the pigment light mainly includes light with a wavelength range of more than 600 nm.

For example, in some embodiments, as shown in FIG. 2, in the texture recognition device 100, the image sensor array 120 is disposed on the side of the pixel unit array away from the touch side 112, and the texture recognition device 100 further includes a filter layer 140, the filter layer 104 is between the image sensor array 120 and the pixel unit array, and can filter light with a wavelength range of more than 600 nm, thereby preventing the pigment light from entering the image sensor array 120 and from affecting the imaging effect of the image sensor 121.

For example, in a case where the texture recognition device 100 includes the filter layer 140, lighting a plurality of pixel units 101 arranged continuously includes: lighting green sub-pixel units 1012 or blue sub-pixel units 1013 in the plurality of pixel units 101, to allow the plurality of pixel units 101 to emit green light or blue light, so as to form a monochromatic photosensitive light source, thereby reducing the afterimage region formed by the photosensitive light source on the image sensor array 120, and because the filter layer 104 can transmit green light or blue light, the arrangement of the filter layer 104 does not affect the imaging effect of the image sensor array 120.

For example, the filter layer 104 may include an organic resin material or an inorganic material. For example, the organic resin material can be doped with colored dyes, and the colored dyes can absorb light with a wavelength range of more than 600 nm. The colored dye includes bromamine acid derivatives and the like, for example. For example, the inorganic material may include silicon dioxide, titanium oxide, etc. The embodiments of the present disclosure do not limit the material of the filter layer 104.

For example, in one example, the filter layer 104 and the image sensor array 120 are sequentially connected to a non-display side of the display panel 110 through an adhesive, such as an optical clear adhesive (OCA), and therefore the filter layer 104 spaces the display panel 110 from the image sensor array 120. For example, in another example, the image sensor array may be integrated in the display panel, and the filter layer may be formed between the image sensor and the light-emitting device of the pixel unit, for example, may be formed by an existing functional layer in the display panel, such as a planarization layer or a pixel defining layer, thereby simplifying the manufacturing process of the display panel.

For example, in some embodiments, the display panel 110 may be an organic light emitting diode (OLED) display panel, or a quantum dot light emitting diode (QLED) display panel, etc., which is not limited in the embodiments of the present disclosure. The OLED display panel may be, for example, a flexible OLED display panel. The OLED display panel has the characteristics of self-luminous, and the light emission of the display pixel unit of the OLED display panel can also be controlled or modulated according to needs, thereby providing convenience for texture collection and helping to improve the integration of the device.

For example, in addition to the pixel unit array, the display panel 110 also includes signal lines (including gate lines, data lines, detection lines, etc.) for providing electrical signals (including scan signals, data signals, detection signals, etc.), and each sub-pixel includes a light-emitting device (for example, an OLED device) and a pixel driving circuit (for example, including a thin film transistor, a capacitor, etc.) for driving the light-emitting device (OLED device) to emit light. For example, the light-emitting state of the light-emitting device can be controlled by the pixel driving circuit to achieve the lighting of the pixel unit, so as to form the photosensitive light source, and the like. For example, according to needs, the display panel 110 may further include other structures or functional layers, for example, further includes an encapsulation layer, a touch structure, a polarizer, and the like on the light emitting side of the display panel. These structures are connected to the display panel 110 by, for example, optical transparent adhesives. The embodiments of the present disclosure do not limit the specific structure of the display panel.

For example, in some embodiments, the image sensor 121 may be a photodiode (for example, a PIN-type diode or a PN-type diode) or other suitable types of image sensors. As needed, the image sensor 121, for example, may only sense light of a certain wavelength (for example, red light or green light), or may sense all visible light. For example, the image sensor 121 is coupled to a processor (such as an integrated circuit chip) through a lead wire, so that the collected texture image can be transmitted to the processor in the form of data signals, and the processor can implement operations such as texture recognition. For example, the processor may be implemented by a general-purpose processor or a dedicated processor, which is not limited by the embodiments of the present disclosure.

It should be noted that the above embodiments are introduced by taking a case that the photosensitive light source is the point light source as an example. In other embodiments, the photosensitive light source may also be a line light source or other patterned light sources, and the embodiments of the present disclosure are not specifically limited thereto. In addition, the point photosensitive light source can be obtained by lighting a plurality of sub-light sources arranged centrally, and these sub-light sources may be arranged in an approximately square shape, an approximately circle shape, and in some cases, may also be formed in an irregular pattern, and the embodiments of the present disclosure do not specifically limit this.

Some embodiments of the present disclosure further provide a texture recognition device. Referring to FIG. 2, the texture recognition device 100 has a touch side 112 (shown as the upper side of the texture recognition device 100), and includes a light source array, an image sensor array 120, and a controller 130. The light source array includes a plurality of sub-light sources 111. The image sensor array 120 is disposed on a side of the light source array and includes a plurality of image sensors 121, and the plurality of image sensors 121 is configured to be capable of receiving light emitted from the sub-light sources 111 and then reflected by the texture to the image sensors 121 for a texture collection. The controller 130 is configured to control the light source array to operate to provide a first photosensitive light source at a first moment, and to control the light source array to operate to provide a second photosensitive light source at the first moment or a second moment different from the first moment. A first imaging range of the first photosensitive light source on the image sensor array 120 partially overlaps with a second imaging range of the second photosensitive light source on the image sensor array 120.

For example, in some embodiments, the texture recognition device 100 includes a display panel 110, the display panel 110 includes a pixel unit array, and the pixel unit array includes a plurality of pixel units 101. For example, the pixel unit array of the display panel 110 is implemented as the light source array, and the plurality of pixel units 101 are implemented as the plurality of sub-light sources 111. In this case, the controller 130 is coupled to the pixel unit array, and is configured to, in the process of the image sensor array 120 collecting the texture, control to light a plurality of pixel units 101 arranged continuously to serve as the first photosensitive light source of the image sensor array 120 at the first moment, and to light a plurality of pixel units 101 arranged continuously to serve as the second photosensitive light source at the first moment or at the second moment different from the first moment.

For the lighting method of the photosensitive light sources and the imaging ranges on the image sensor array, etc., reference may be made to the above embodiments, and details are not described herein again.

For example, the controller 130 may be various types of integrated circuit chips with a processing function, and may have various computing architectures, such as a complex instruction set computer (CISC) structure, a reduced instruction set computer (RISC) structure, or a structure that combines a plurality of instruction sets. In some embodiments, the controller 230 may be a microprocessor, such as an X86 processor or an ARM processor, or may be a digital processor (DSP) or the like.

For example, in some embodiments, the controller 130 may further include a memory, the memory is used for storing a control program for lighting a plurality of light sources to form a photosensitive light source, a control program for lighting a plurality of photosensitive light sources in a time-sharing manner, or the like, the memory is also used to store data received or generated during the operating process. For example, the storage unit may be any form of storage medium, such as a volatile memory or a non-volatile memory, etc., such as a semiconductor memory or a magnetic medium memory, etc., which is not limited in the embodiments of the present disclosure.

The following statements should be noted:

(1) The accompanying drawings of the embodiments of the present disclosure involve only the structure(s) in connection with the embodiment(s) of the present disclosure, and other structure(s) can refer to common design(s).

(2) For the purpose of clarity only, in accompanying drawings for illustrating the embodiment(s) of the present disclosure, the thickness of a layer or a region may be enlarged or reduced, that is, these drawings are not drawn in a real scale. It should understood that, in the case in which a component such as a layer, film, region, substrate or the like is referred to be "on" or "under" another component, the component may be "directly" "on" or "under" the another component or a component may be interposed therebetween.

(3) In case of no conflict, the embodiments of the present disclosure and the features in the embodiments can be combined with each other to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A drive method for a texture recognition device, wherein the texture recognition device comprises:
   a light source array, comprising a plurality of sub-light sources; and
   an image sensor array, on a side of the light source array, and comprising a plurality of image sensors, wherein the plurality of image sensors are configured to receive light emitted from the plurality of sub-light sources and then reflected by a texture to the plurality of image sensors for a texture collection;

the drive method comprises:

at a first moment, the light source array operating to provide a first photosensitive light source, and at the first moment or a second moment different from the first moment, the light source array operating to provide a second photosensitive light source, wherein a first imaging range of the first photosensitive light source on the image sensor array partially overlaps with a second imaging range of the second photosensitive light source on the image sensor array;

wherein the first photosensitive light source comprises at least one sub-light source of the plurality of sub-light sources, the second photosensitive light source comprises multiple sub-light sources of the plurality of sub-light sources, in a case where the second photosensitive light source is provided at the second moment, a count of sub-light sources comprised in the second photosensitive light source is more than a count of sub-light sources comprised in the first photosensitive light source, the first imaging range is in a first ring shape, the second imaging range is in a second ring shape, and the second ring shape at least partially covers a ring center portion of the first ring shape.

2. The drive method according to claim 1, wherein at the first moment, the light source array operates to further provide a third photosensitive light source, the third photosensitive light source comprises at least one sub-light source of the plurality of sub-light sources, a count of sub-light sources comprised in the third photosensitive light source is equal to the count of sub-light sources comprised in the first photosensitive light source, a third imaging range of the third photosensitive light source on the image sensor array is in a third ring shape, and the second ring shape at least partially covers a ring center portion of the third ring shape.

3. The drive method according to claim 1, wherein the count of sub-light sources comprised in the second photosensitive light source provided at the second moment is 2-3 times the count of sub-light sources comprised in the first photosensitive light source provided at the first moment.

4. The drive method according to claim 3, wherein the first photosensitive light source comprises 3×3 sub-light sources arranged in an array, and the second photosensitive light source comprises 7×7 sub-light sources arranged in an array.

5. The drive method according to claim 1, wherein the first photosensitive light source comprises at least one sub-light source of the plurality of sub-light sources, the second photosensitive light source comprises at least one sub-light source of the plurality of sub-light sources, in a case where the second photosensitive light source is provided at the first moment, a count of sub-light sources comprised in the second photosensitive light source is equal to a count of sub-light sources comprised in the first photosensitive light source, the first imaging range is in a first ring shape, the second imaging range is in a second ring shape, the first ring shape and the second ring shape have only two intersections, and two closest points, which are on an inner circle of the first ring shape and an inner circle of the second ring shape, respectively, are a first point and a second point, a rectangular imaging range formed by taking the two intersections, the first point, and the second point as centers of four sides of the rectangular imaging range is used to image the texture.

6. The drive method according to claim 5, wherein each of the first photosensitive light source and the second photosensitive light source comprises 7×7 sub-light sources arranged in an array.

7. The drive method according to claim 1, wherein the first photosensitive light source comprises at least one sub-light source of the plurality of sub-light sources, the second photosensitive light source comprises at least one sub-light source of the plurality of sub-light sources, in a case where the second photosensitive light source is provided at the second moment, a count of sub-light sources comprised in the second photosensitive light source is equal to a count of sub-light sources comprised in the first photosensitive light source, the first imaging range is in a first ring shape, the second imaging range is in a second ring shape, the second ring shape at least partially covers a ring center portion of the first ring shape, and the first ring shape at least partially covers a ring center portion of the second ring shape, an imaging range formed within a range covered by the first ring shape and the second ring shape is used to image the texture.

8. The drive method according to claim 7, wherein each of the first photosensitive light source and the second photosensitive light source comprises 7×7 sub-light sources arranged in an array.

9. The drive method according to claim 7, wherein the ring center portion of the first ring shape and the ring center portion of the second ring shape have an overlapping portion, thereby forming the imaging range, which is in a shape of a Chinese character "回", to image the texture.

10. The drive method according to claim 1, further comprising: providing a plurality of first photosensitive light sources arranged in an array at the first moment; and providing a plurality of second photosensitive light sources arranged in an array at the first moment or at the second moment different from the first moment.

11. The drive method according to claim 1, wherein the texture recognition device has a touch side;

the drive method comprises:

detecting a contact area between the texture and the touch side, respectively determining a count of sub-light sources comprised in the first photosensitive light source and a count of sub-light sources comprised the second photosensitive light source according to the contact area, and providing a plurality of first photosensitive light sources arranged in an array at the first moment and providing a plurality of second photosensitive light sources arranged in an array at the first moment or at the second moment different from the first moment to image the texture.

12. The drive method according to claim 1, wherein the texture recognition device has a touch side;

the drive method comprises:

detecting a contact area between the texture and the touch side, in a case where the contact area is greater than a threshold area, providing a plurality of first photosensitive light sources arranged in an array at the first moment and providing a plurality of second photosensitive light sources arranged in an array at the first moment or at the second moment different from the first moment to image the texture.

13. The drive method according to claim 1, wherein the texture recognition device comprises a display panel, the display panel comprises a pixel unit array, and the pixel unit array comprises a plurality of pixel units;
the light source array comprises the pixel unit array, and the plurality of sub-light sources comprise the plurality of pixel units;
the drive method comprises:
at the first moment, lighting multiple pixel units arranged continuously to provide the first photosensitive light source, and at the first moment or the second moment different from the first moment, lighting multiple pixel units arranged continuously to provide the second photosensitive light source.

14. The drive method according to claim 13, wherein each pixel unit comprises a plurality of sub-pixel units that emit light of different colors;
lighting the multiple pixel units arranged continuously comprises:
lighting sub-pixel units, which are capable of emitting light of a same color, in the multiple pixel units, to allow the multiple pixel units to emit monochromatic light of the same color.

15. The drive method according to claim 13, wherein the texture recognition device has a touch side, and the image sensor array is on a side of the pixel unit array away from the touch side,
the texture recognition device further comprises a filter layer, and the filter layer is between the image sensor array and the pixel unit array and is capable of filtering light with a wavelength range of more than 600 nm;
each pixel unit comprises a green sub-pixel unit, a blue sub-pixel unit, and a red sub-pixel unit, in the drive method, lighting the multiple pixel units arranged continuously comprises:
lighting green sub-pixel units or blue sub-pixel units in the multiple pixel units, to allow the multiple pixel units to emit green light or blue light.

16. A texture recognition device, comprising:
a light source array, comprising a plurality of sub-light sources;
an image sensor array, on a side of the light source array, comprising a plurality of image sensors, wherein the plurality of image sensors are configured to receive light emitted from the plurality of sub-light sources and then reflected by a texture to the plurality of image sensors for a texture collection;
a controller, configured to control the light source array to operate to provide a first photosensitive light source at a first moment, and to control the light source array to operate to provide a second photosensitive light source at the first moment or a second moment different from the first moment,
wherein a first imaging range of the first photosensitive light source on the image sensor array partially overlaps with a second imaging range of the second photosensitive light source on the image sensor array;
the first photosensitive light source comprises at least one sub-light source of the plurality of sub-light sources, the second photosensitive light source comprises multiple sub-light sources of the plurality of sub-light sources, in a case where the second photosensitive light source is provided at the second moment, a count of sub-light sources comprised in the second photosensitive light source is more than a count of sub-light sources comprised in the first photosensitive light source,
the first imaging range is in a first ring shape, the second imaging range is in a second ring shape, and the second ring shape at least partially covers a ring center portion of the first ring shape.

17. The texture recognition device according to claim 16, further comprising a display panel, wherein the display panel comprises a pixel unit array, the pixel unit array comprises a plurality of pixel units;
the light source array comprises the pixel unit array, and the plurality of sub-light sources comprise the plurality of pixel units;
the controller is configured to light multiple pixel units arranged continuously at the first moment to provide the first photosensitive light source, and to light multiple pixel units arranged continuously at the first moment or at the second moment different from the first moment to provide the second photosensitive light source.

18. The texture recognition device according to claim 17, wherein each pixel unit comprises a plurality of sub-pixel units that emit light of different colors;
the controller is configured to light sub-pixel units, which are capable of emitting light of a same color, in the multiple pixel units at the first moment, to allow the multiple pixel units to emit monochromatic light of the same color.

19. The texture recognition device according to claim 17, wherein the texture recognition device has a touch side, and the image sensor array is on a side of the pixel unit array away from the touch side,
the texture recognition device further comprises:
a filter layer, between the image sensor array and the pixel unit array, being capable of filtering light with a wavelength range of more than 600 nm.

* * * * *